(12) United States Patent
Yonemitsu (10) Patent No.: US 8,233,053 B2
(45) Date of Patent: Jul. 31, 2012

(54) IMAGING APPARATUS AND IMAGE SIGNAL GENERATING APPARATUS

(75) Inventor: Tetsumasa Yonemitsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 1034 days.

(21) Appl. No.: 12/011,510

(22) Filed: Jan. 28, 2008

(65) Prior Publication Data

US 2008/0180541 A1    Jul. 31, 2008

(30) Foreign Application Priority Data

Jan. 30, 2007  (JP) ................ P2007-019846

(51) Int. Cl.
H04N 5/235 (2006.01)
H04N 3/14 (2006.01)
(52) U.S. Cl. ............ 348/221.1; 348/312; 348/138
(58) Field of Classification Search ........... 348/138, 348/222.1, 312
See application file for complete search history.

(56) References Cited

U.S. PATENT DOCUMENTS

| | | | | |
|---|---|---|---|---|
| 4,376,948 A * | 3/1983 | Dischert et al. | ............... | 348/472 |
| 4,799,102 A * | 1/1989 | Kobayashi | .................... | 348/639 |
| 5,003,398 A * | 3/1991 | Suzuki | .......................... | 348/297 |
| 6,211,918 B1 * | 4/2001 | Uwabata et al. | ............. | 348/458 |
| 7,324,136 B2 * | 1/2008 | Kubo | ......................... | 348/220.1 |
| 7,489,356 B2 * | 2/2009 | Nakahira | ...................... | 348/311 |
| 7,667,756 B2 * | 2/2010 | Suzuki | .......................... | 348/312 |
| 7,726,569 B2 * | 6/2010 | Ishii | .............................. | 235/454 |
| 7,796,176 B2 * | 9/2010 | Mimata et al. | ................ | 348/312 |
| 2004/0008388 A1 * | 1/2004 | Tanaka | .......................... | 358/513 |
| 2004/0095493 A1 * | 5/2004 | Sakakibara | ................... | 348/302 |
| 2005/0231598 A1 | 10/2005 | Dutta et al. | | |
| 2006/0022862 A1 * | 2/2006 | Egawa et al. | ................. | 341/155 |
| 2007/0139521 A1 * | 6/2007 | Takahashi | ....................... | 348/65 |
| 2007/0211153 A1 * | 9/2007 | Uchida et al. | ............ | 348/231.99 |
| 2008/0309803 A1 * | 12/2008 | Morita et al. | ................. | 348/255 |
| 2010/0201874 A1 * | 8/2010 | Kawana et al. | ............... | 348/537 |

FOREIGN PATENT DOCUMENTS

| | | |
|---|---|---|
| JP | 06-225185 | 8/1994 |
| JP | 9-65211 | 3/1997 |
| JP | 10-174001 | 6/1998 |
| JP | 10-276362 | 10/1998 |
| JP | 2001-111902 | 4/2001 |
| JP | 2002-009243 | 1/2002 |

(Continued)

OTHER PUBLICATIONS

Japanese Office Action.

(Continued)

*Primary Examiner* — Hung Lam
(74) *Attorney, Agent, or Firm* — Frommer Lawrence & Haug LLP; William S. Frommer; Ellen Marcie Emas (57) ABSTRACT

Disclosed is an imaging apparatus including an imaging element photo-electrically converting light from a subject to generate an electric signal, an output unit generating an image signal based on the electric signal output from the imaging element, a timing generator generating a clock for image signal processing to drive the imaging element and the output unit based on a reference clock externally input, a control unit controlling the imaging element, the output unit, and the timing generator. The imaging apparatus further includes a phase delaying unit delaying a phase of the clock for the image signal processing output from the timing generator to supply the clock to the control unit.

12 Claims, 6 Drawing Sheets

FOREIGN PATENT DOCUMENTS

| | | |
|---|---|---|
| JP | 2003-143493 | 5/2003 |
| JP | 2003-179814 | 6/2003 |
| JP | 2005-79739 | 3/2005 |
| JP | 2005 536167 | 11/2005 |
| JP | 2006-238338 | 9/2006 |

OTHER PUBLICATIONS

Office Action of Apr. 3, 2012 issued in Japanese Application No. 2007-019846.

* cited by examiner

IMAGING APPARATUS AND IMAGE SIGNAL GENERATING APPARATUS

CROSS REFERENCE TO RELATED APPLICATIONS

The present invention contains subject matter related to Japanese Patent Application 2007-019846 filed in the Japanese Patent Office on Jan. 30, 2007, the entire contents of which being incorporated herein by reference.

BACKGROUND OF THE INVENTION

1. Field of the Invention

This invention relates to an imaging apparatus and image signal generating apparatus suitable for use in image sensors such as an endoscope.

2. Description of the Related Art

Image sensors such as Charge Coupled Devices (CCDs) or Complementary Metal Oxide Semiconductor (CMOS) have widely been used in devices and instruments such as digital still cameras, mobile telephone terminals, and endoscopes. Some of these apparatuses incorporate so-called camera modules such as image sensors and analog front end (AFE) chips each formed as a circuit. The camera modules are usually located at a distance from a microcomputer that controls components of the apparatus incorporating the camera modules.

The devices and instruments having the camera modules usually has a long transmission line connecting between the camera modules and the microcomputer, and when all the instruction signals and data are transmitted simultaneously via the transmission line, a large amount of signals are transmitted via the transmission line, thereby causing extraneous emission noises to occur in the transmission line.

Japanese Unexamined Patent Application Publication (Translation of PCT Application) No. 2005-536167 discloses a digital host apparatus having camera modules that includes a processor specific to the camera modules other than a processor for the digital host apparatus. In the digital host apparatus according to this publication, the processor utilized specific to the camera modules is provided on the camera module side.

SUMMARY OF THE INVENTION

A microcomputer utilized specific to camera modules is sometimes provided separately so as to translate instruction signals received from the microcomputer and assign the translated instructions to parts of the camera module. In this case, the microcomputer and the AFE circuits of the camera modules are closely located. In general, different clock sources are utilized between the image sensor or AFE circuit and the microcomputer, and hence the closer the distance between the image sensor or AFE circuit and the microcomputer is, the higher the probability the clock supplied to the microcomputer will interfere image synchronization clock supplied to the image sensor or AFE circuit. As a result, analog-to-digital converters (hereinafter called AD converter) include increased noises, and hence image finally displayed on a display unit are likely to contain beat noises.

Likewise, an apparatus configured to have a microcomputer located closely to AFE circuits for decreasing a size of the apparatus may exhibit a similar phenomenon.

Thus, this invention attempts to provide concepts for preventing beat noises due to a clock generated from the microcomputer that interferes an image synchronization clock.

An embodiment of the present invention includes an imaging element photo-electrically converting light from a subject to generate an electric signal, and an output unit generating an image signal based on the electric signal output from the imaging element. The present embodiment further includes a timing generator generating a clock for image signal processing to drive the imaging element and the output unit based on a reference clock externally input, a control unit controlling the imaging element, the output unit, and the timing generator, and a phase delaying unit delaying a phase of the clock for the image signal processing output from the timing generator to supply the clock to the control unit.

With this configuration, a clock driving the control unit or microcomputer is generated based on the clock for the image signal processing generated from the timing generator.

According to an embodiment of the present invention, since the clock driving the control unit is generated based on the clock for the image signal processing generated from the timing generator, it is possible to suppress beat noises due to a clock generated from the control unit that interferes an image synchronization clock.

DESCRIPTION OF THE PREFERRED EMBODIMENTS

Hereinafter, embodiments of the present invention will be described referring to accompanied drawings.

Figure 1:
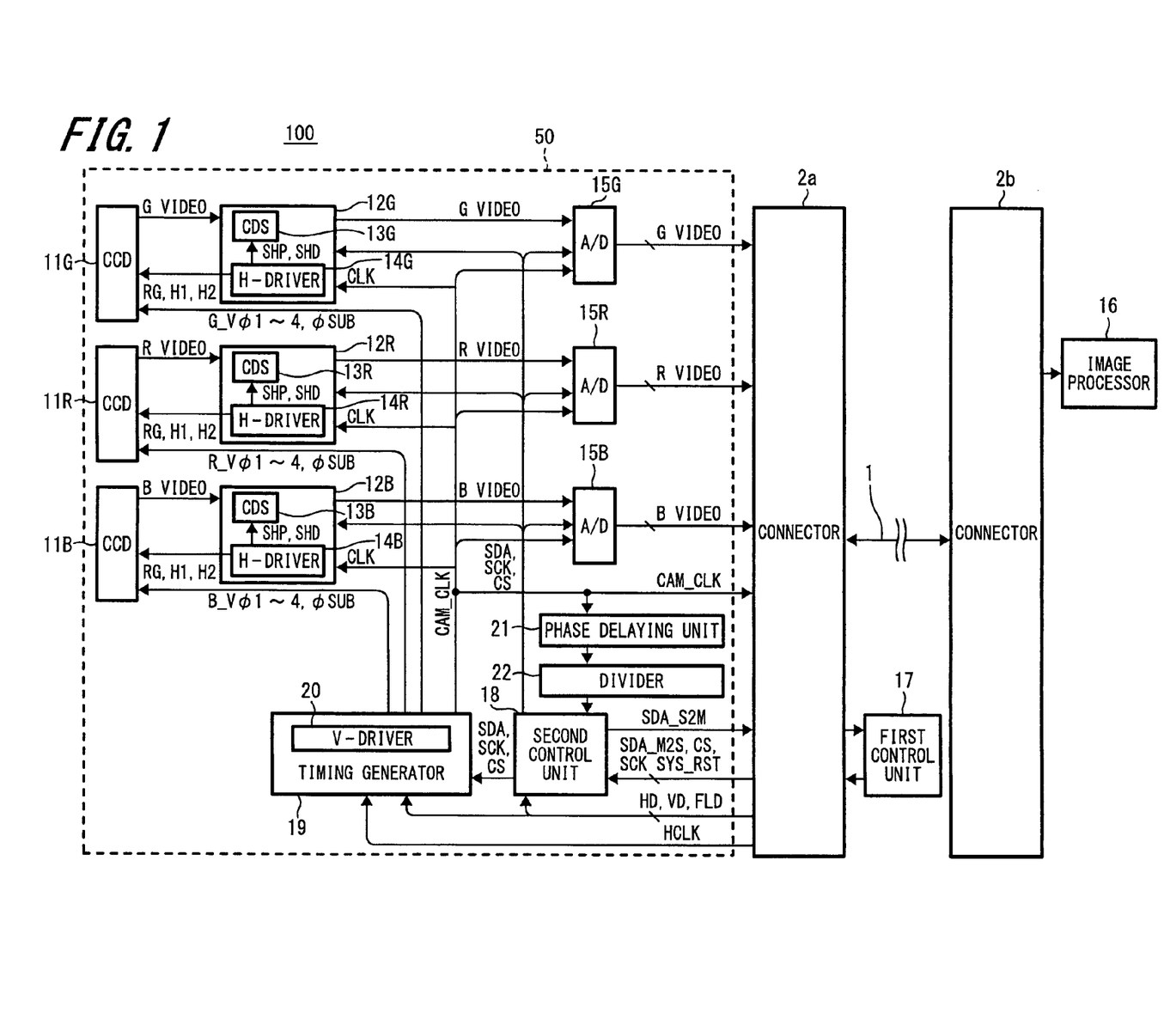
FIG. 1 is a block diagram illustrating an internal configuration example of an imaging apparatus according to one embodiment of the present invention.

FIG. 1 illustrates a configuration example of an imaging apparatus according to one embodiment of the present invention. An imaging apparatus 100 according to the present embodiment can be utilized for various applications such as a medical endoscope. The imaging apparatus 100 shown in FIG. 1 employs a 3CCD imaging system, and hence has three imaging elements of CCD imagers (hereinafter called CCD) 11G, 11R, and 11B. The CCDs 11G, 11R, and 11B photo-electrically convert light of G (Green), R (Red), and B (Blue) colors, which are decomposed by a color separation prism (not shown), into charge and generate an electric signal. The imaging apparatus 100 further includes a vertical transmission driver 20 (hereinafter called V-driver) for vertically transmitting signal charge photo-electrically converted and accumulated by the individual CCDs 11, and horizontal transmission drivers (hereinafter H-driver) 14G, 14R, and 14B for horizontally transmitting the signal charge vertically transmitted by the V-driver 20.

The V-driver 20 supplies vertical transmission pulses Vφ1 to Vφ4 to CCDs 11G, 11R, and 11B, while the H-drivers 14G, 14R, 14B supply horizontal transmission pulses H1 and H2 to the CCDs 11G, 11R, and 11B. The H-drivers 14G, 14R, and 14B individually supply reset pulses RGs to the CCDs 11G, 11R, and 11B for resetting signal charge accumulated therein. The pulses applied to the CCDs 11G, 11R, and 11B are generated in synchronization with an image synchronization clock (CAM_CLK) supplied from a timing generator 19.

The timing generator 19 generates the image synchronization clock (CAM_CLK) for driving the CCDs 11G, 11R, 11B; V-driver; H-drivers 14G, 14R, 14B; later-described CDS circuits 13G, 13R, 13G; analog-to-digital converters (hereinafter called AD converters) 15G, 15R, 15B based on a reference clock (HCLK) supplied from a first control unit 17 controlling components of the imaging apparatus 100. The generated image synchronization clock (CAM_CLK) is supplied to each component of the timing generator 19. The image synchronization clock indicates a clock having a frequency for image signal processing in synchronization with horizontal and vertical frequencies of an image signal. In the present embodiment, the first control unit 17 supplies a clock signal having a frequency of 81 MHz, which is then divided into two to obtain a clock signal having a frequency of 40.5 MHz at the timing generator 19.

The signal charge received by the CCDs 11G, 11R, 11B are read via the V-driver 20 and H-drivers 14G, 14R, 14B, then converted into voltage corresponding to the signal charge at an output circuit (not shown), and supplied to CDS (Correlated Double Sampling) circuits 13G, 13R, 13B, respectively.

Figures 3A, 3B:
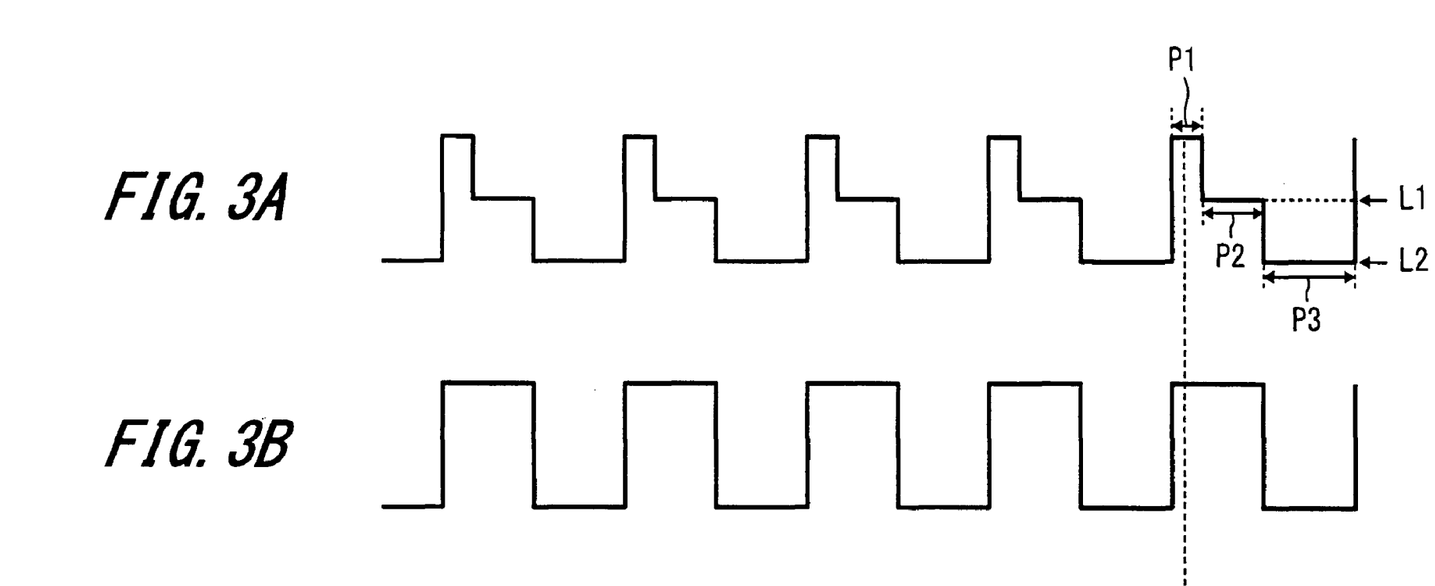
FIGS. 3A to 3C are explanatory diagrams illustrating a change-point of a clock of the second control unit according to one embodiment of the present invention.

The CDS circuits 13G, 13R, 13B lower a reset noise contained in the output signals received from the CCDs 11G, 11R, and 11B. The output image signals from the CCDs 11G, 11R, 11B are classified into the following three periods: a reset period P1; a field through level 0-level period P2; and a signal period P3, as shown in FIG. 3A. The CDS circuits 13G, 13R, 13B compute the difference between the field-through level L1 and the field-through level L2 while clamping the voltage in the field through level 0-level period P2, and sampling and holding signals in the signal period P3. The CDS circuits 13G, 13R, 13B then eliminate a reset noise based on the obtained difference.

The image signals output from the CDS circuits 13G, 13R, 13B are adjusted to a certain signal level and supplied to the AD converters 15G, 15R, 15B. The AD converters 15G, 15R, 15B convert analog image signals into digital signals.

The aforementioned optical system, a camera block 50 incorporating the CCDs 11G, 11R, 11B, the CDS circuits 13G, 13R, 13B or AD converters 15G, 15R, 15B, an image processor 16 configured to image process image signals output from the camera block 50 are individually placed on separate substrates. The resulting optical system, camera block 50, and image processor 16 are each connected to a connector 2a on the camera block 50 side and a connector 2b on the image processor 16. The image processor 16 carries out processing such as feedback clamping that clamps a black level OB (optical black) of the digital image signals supplied from the AD converters 15G, 15R, 15B to a certain standard value, knee correction that compresses the image signals exceeding a certain level, γ correction that corrects the signals along the γ-curve configured with a certain level of the image signals, and white clip processing that adjusts while balance.

The connector 2a of the camera block 50 is also connected with a first control unit 17 that controls components of an imaging apparatus 100. The first control unit 17 includes components such as a microcomputer. According to the present embodiment, the camera block 50 includes a second control unit 18 for reducing amounts of signals transmitted from the first control unit 17 to the components of the camera block 50. The second control unit 18 translates some of the instructions for setting the components of the camera block 50 transmitted from the first control unit 17 and transmits the resulting signals to the components of the camera block 50.

Examples of the controls conducted by the second control unit 18 includes variable-control of shutter speed on a timing generator 19, gain control on the AD converters 15G, 15R, 15B, and switching image rates (50i/60i). The second control unit 18 also individually controls switching to a standby mode or initializing settings of the components of the camera block 50 at certain cycles to suppress the power consumption of the imaging apparatus 100.

Figure 2:
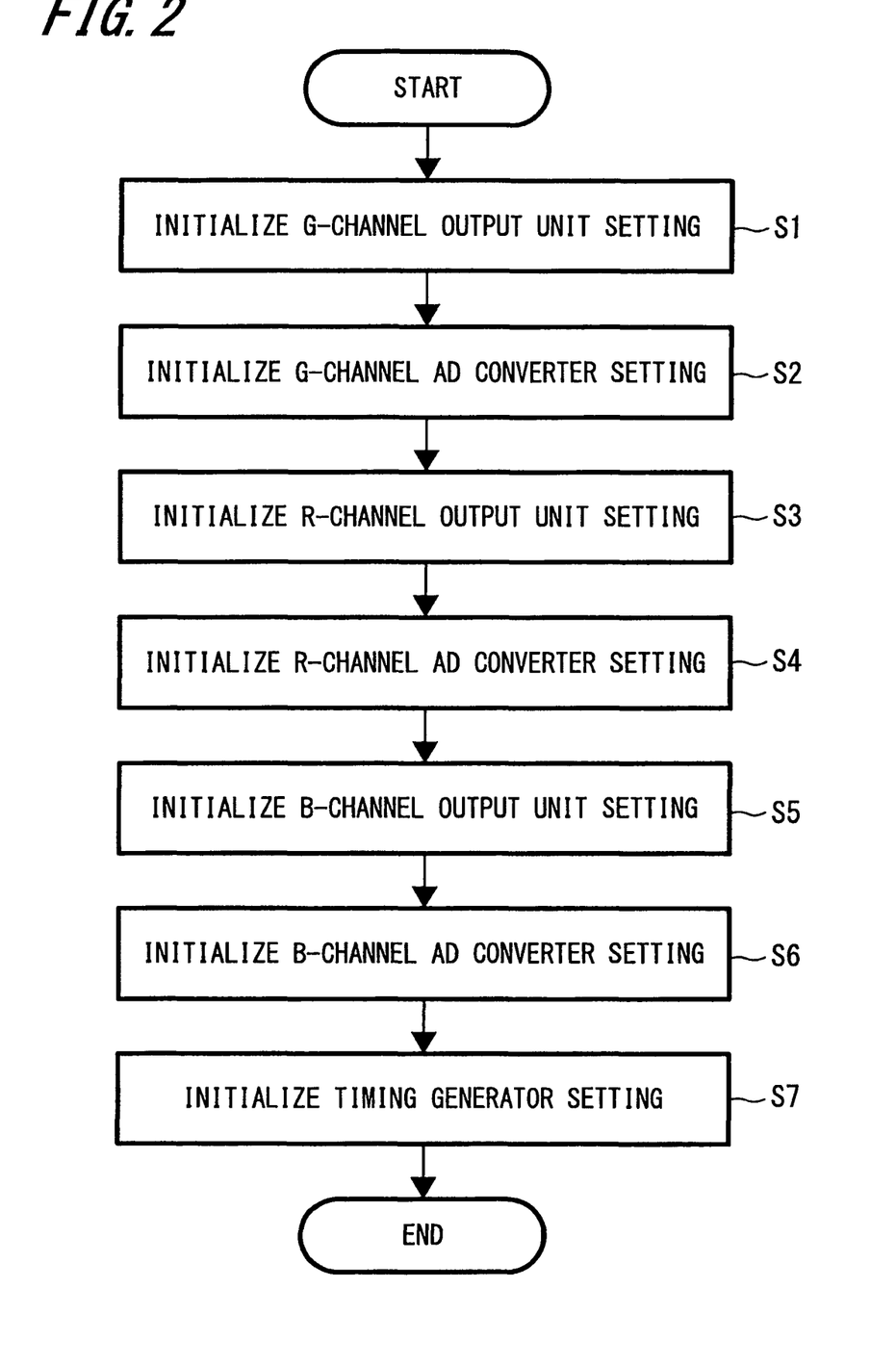
FIG. 2 is a flowchart illustrating an example of initializing settings of an imaging apparatus via a second control unit according to one embodiment of the present invention.

The second control unit 18 initializes each component of the camera block 50, in a case where images are caused to deform due to interference derived from static electricity, so as to sequentially refreshes each frame of the component for immediately eliminating such image deformation. FIG. 2 shows a flowchart illustrating a processing example of initializing settings according to one embodiment of the present invention. The initialization includes the steps of initializing a G-channel output unit setting (12G in FIG. 1) having the CDS circuit 12G and H driver 14G (Step S1), initializing a G-channel AD converter 15G setting per frame (Step S2), initializing an R-channel output unit 12R setting (Step S3), initializing an R-channel AD converter 15R setting (Step S4), initializing a B-channel output unit 12B setting (Step S5), initializing a B-channel AD converter 15B setting (Step S6), and initializing a timing generator 19 setting (Step S7). In the present embodiment, since the camera block includes seven components, initialization is conducted at seven frame cycles. Notice that the sequence of initialization steps is not limited to that of the steps illustrated in FIG. 2; however, the initialization can be conducted in any arbitrary sequence of the steps.

Accordingly, in a case where the camera block 50 is provided as an original Equipment Manufacturing (OEM), detailed parameters of the components in the camera block 50 can be concealed from the OEM supplier by incorporating the second control unit 18 for translation in the camera block 50.

In this case, when a clock source for driving the second control unit 18 is separately provided in the camera block 50, the clock supplied to the second control unit 18 interferes image synchronization clocks supplied to the CDS circuits 13G, 13R, 13B or those supplied to the AD converters 15G, 15R, 15B in the camera block 50, thereby increasing the possibility of generating beat noises in displayed images. The present embodiment configured to generate a clock driving the second control unit 18 based on the image synchronization clocks supplied from the timing generator 19 to the CDS circuits 13G, 13R, 13B or to the AD converters 15G, 15R, 15B.

The present embodiment includes a phase delaying unit 18 configured to adjust a phase of the image synchronization clocks to be delayed so that the clock from the second control unit 18 will not interfere the image synchronization clocks supplied from the timing generator 19 to the CDS circuits 13G, 13R, 13B or to the AD converters 15G, 15R, 15B to cause noises. The present embodiment further includes a divider 22 dividing the image synchronization clocks. In the present embodiment, the divider 22 divides input clocks into four to thereby generate a clock of 10.125 MHz; that is, 40.5/4=10.125 MHz. The second control unit 18 operates based on the clock of 10.125 MHz.

Figure 3C:
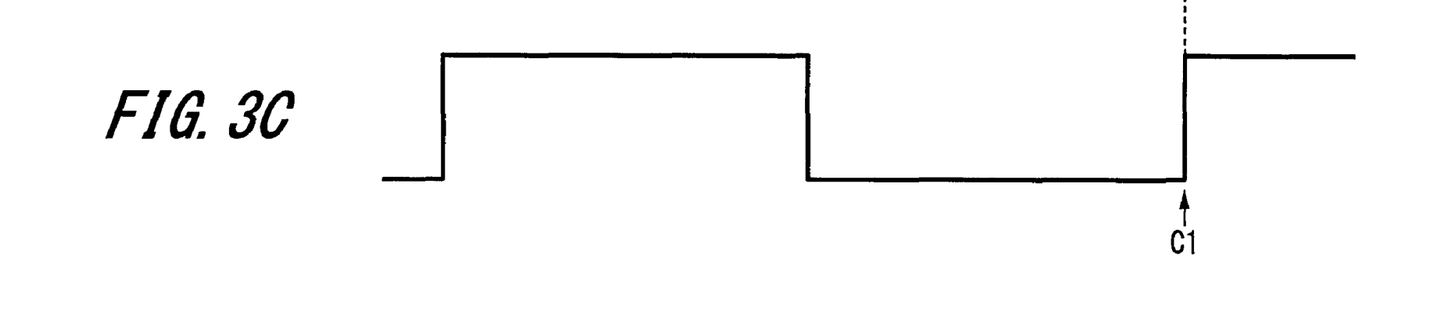

FIGS. 3A to 3C illustrate an example of phase delaying processing at a phase delaying unit 21. FIG. 3A illustrates a waveform of a signal output from the CCDs 11G, 11R, 11B, FIG. 3B illustrates a waveform of an image synchronization clock supplied from the timing generator 19 to individual components of the camera block 100, and FIG. 3C illustrates a waveform of a clock supplied to the second control unit 18. According to the present embodiment, when a change point C1 of the clock transmitted via the second control unit 18 is controlled to appear around the reset period P1; that is, when the change point C1 is controlled not to appear in the field-through period P2 or in the signal period P3, noises will not occur in the image data output from the CDSs 13G, 13R, 13B.

Specifically, the phase delaying unit 21 conducts processing to delay a predetermined amount of the phase of the clock supplied to the second control unit 18. The amount of the delay controlled by the phase delaying unit 21 is determined in advance such that the change point C1 of the clock from the second control unit 18 appears at an optimal position. The optimal position of the change point C1 varies with a supply timing of the reset pulses or arrangements of the components on the substrate in the camera block 50 and hence it is preferable that the optimal position be figured out in advance according to design requirements or conditions. The phase delaying amount to be controlled by the phase delaying unit 21 is determined in advance according to the resulting optimal position. Alternatively, the amount of the phase delay by the phase delaying unit 21 is configured to be variable and optionally be controlled according to the requirements or conditions.

Accordingly, in a case where the camera block 50 is provided as an original Equipment Manufacturing (OEM), detailed parameters of the components in the camera block 50 can be concealed from the OEM supplier by incorporating the second control unit 18 for translation in the camera block 50.

In the present embodiment, the image synchronization clock generated by the timing generator 19 is divided by the divider 22 and then supplied to the second control unit 18. Thus, the present embodiment may not have to include the clock source specific to the second control unit 18.

As described so far, the present embodiment includes no specific clock source to drive the second control unit 18. As a result, the clock causing to operate the second control unit 18 will not interfere the image synchronization clocks supplied to the CDSs 13G, 13R, 13B or the AD converters 15G, 15R, 15B to thereby cause converter noises. Accordingly, the beat noises appearing on the images can be lowered by inhibiting the generation of such converter noises.

Further, in the present embodiment, since the phase of the clock input to the second control unit 18 is controlled based on a drive timing of the CCDs 11G, 11R, 11B, signals sampled and held at the CDS circuits 15G, 15R, 15B are relatively unaffected by the noises.

In the embodiment described so far, microcomputers are utilized to configure the first control unit 17 and second control unit 18; however, a specific IC utilizing an Embedded Programmable Gate Array (EPGA) can also be used for the both control units.

Further, in the aforementioned embodiment, the clock input to the second control unit 18 is first supplied to the phase delaying unit 21 to delay a phase of the clock and then supplied to the divider 22 to divide the clock; however, the embodiment may optionally be configured such that the clock input to the control unit 18 may first be supplied to the divider 22 to divide the clock, and then supplied to the phase delaying unit 21 to delay the phase of the clock.

In the aforementioned embodiment, a CCD is utilized as an image sensor; however, other image elements such as a CMOS may optionally be employed as the image sensor.

According to the aforementioned embodiment, the phase delaying unit 21 delays the phase of the image synchronization clock output from the timing generator 19, and the resulting clock is then supplied to the second control unit 18. As a result, the clock from the second control unit 18 may not be a source of the noises interfering in the image synchronization signal. In contrast, the phase of the image synchronization clock may be delayed while the clock supplied to the second control unit 18 remained unchanged, as shown in FIG. 4.

Figure 4:
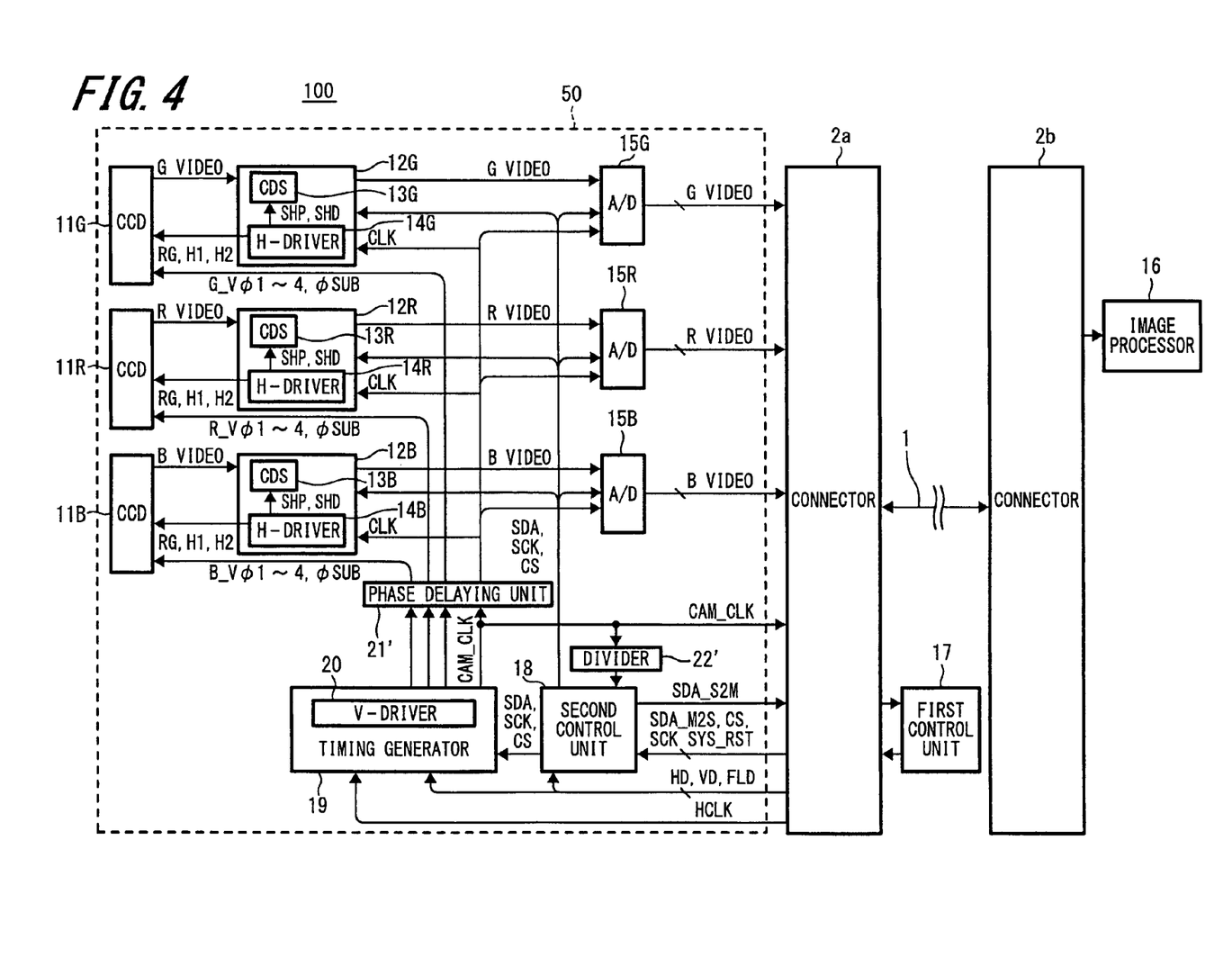
FIG. 4 is a block diagram illustrating an internal configuration example of an imaging apparatus according to another embodiment of the present invention.

FIG. 4 illustrates an example of the imaging apparatus 100 having such a configuration. According to the configuration shown in FIG. 4, a phase delaying unit 21' delays the phase of the image synchronization clock output from the timing generator 19, and the resulting clock is supplied as the image synchronization clock to the CCDs 11G, 11R, 11B, the output units 12G, 12R, 12B, and the AD converters 15G, 15R, 15B. The image synchronization clock prior to being input to the phase delaying unit 21 are divided the divider 22, and the resulting clock is then supplied to the second control unit 18 so as to drive the second control unit 18. In the imaging apparatus having such a configuration, since the clock for driving the second control unit 18 is generated based on the image synchronization clock, the clock for driving the second control unit 18 and image synchronization clock will not mutually interfere. Further, since the phase delaying unit 21' delays the phase of the image synchronization clock supplied to the CCDs 11G, 11R, 11B, the output units 12G, 12R, 12B, and the AD converters 15G, 15R, 15B, the position of the change point C1 of the clock for driving the second control unit 18 can be adjusted based on the waveform of the output signals from the CCDs 11G, 11R, 11B.

Figure 5:
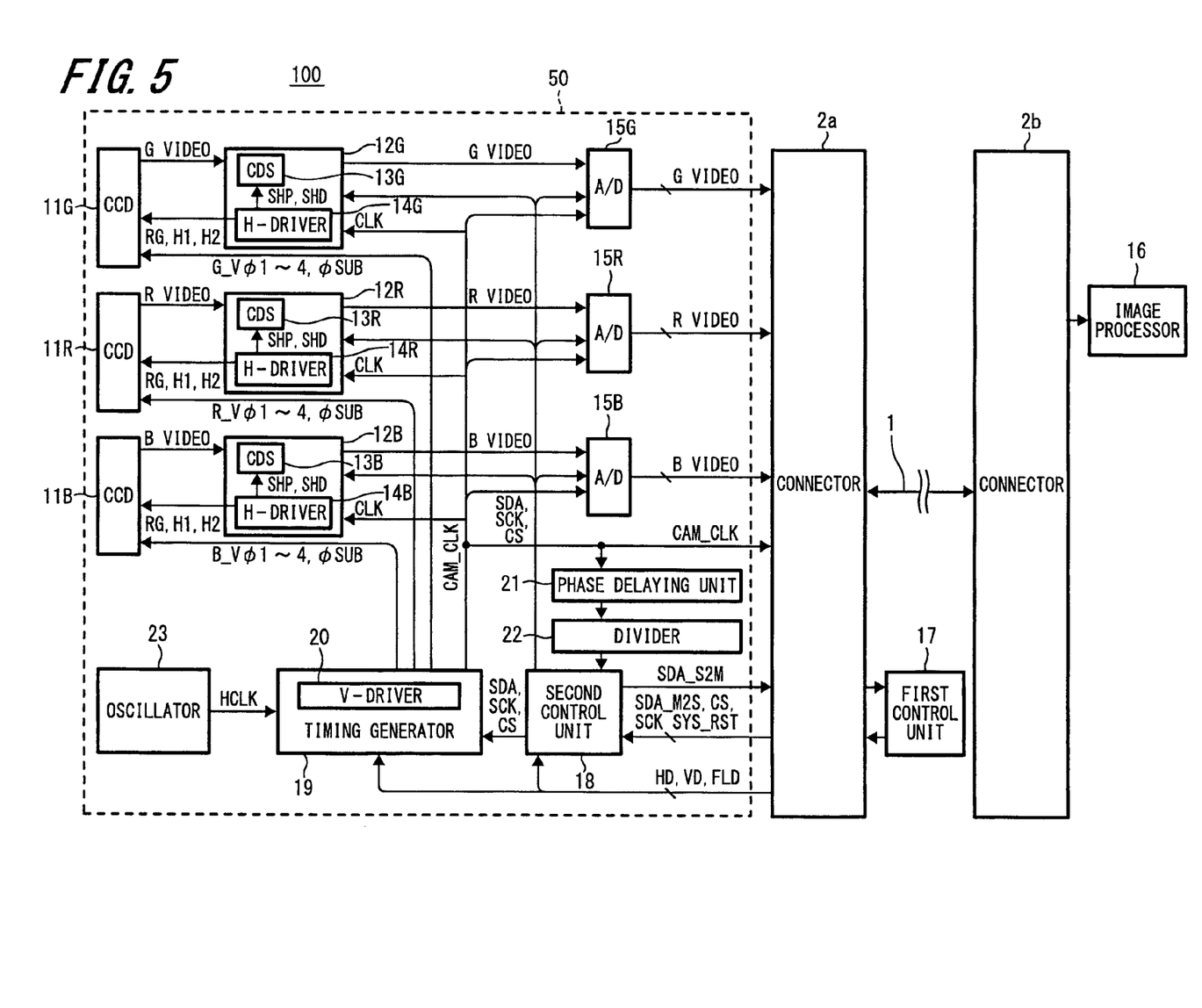
FIG. 5 is a block diagram illustrating an internal configuration example of an imaging apparatus according to yet another embodiment of the present invention.

According to the aforementioned embodiment, the first control unit 17 located at a distance from the camera block 50 supplies the clock driving the components of the camera block 50. However, the camera block 50 may be configured to include a separate clock source (clock generator) such that the components of the camera block 50 can be driven based on the clock generated by the separately provided clock source. FIG. 5 shows a configuration example of the imaging apparatus 100 in which an oscillator 23 is provided with the timing generator 19 as a clock source.

FIG. 5 shows a configuration in which the timing generator 19 divides a reference clock generated by the oscillator 23 to form an image synchronization clock, which is then supplied to the CCDs 11G, 11R, 11B, the output units 12G, 12R, 12B, and the AD converters 15G, 15R, 15B. The phase delaying unit 21 delays the phase of the image synchronization clock, which is then divided by the divider 22 to form a clock for driving the second control unit 18.

Figure 6:
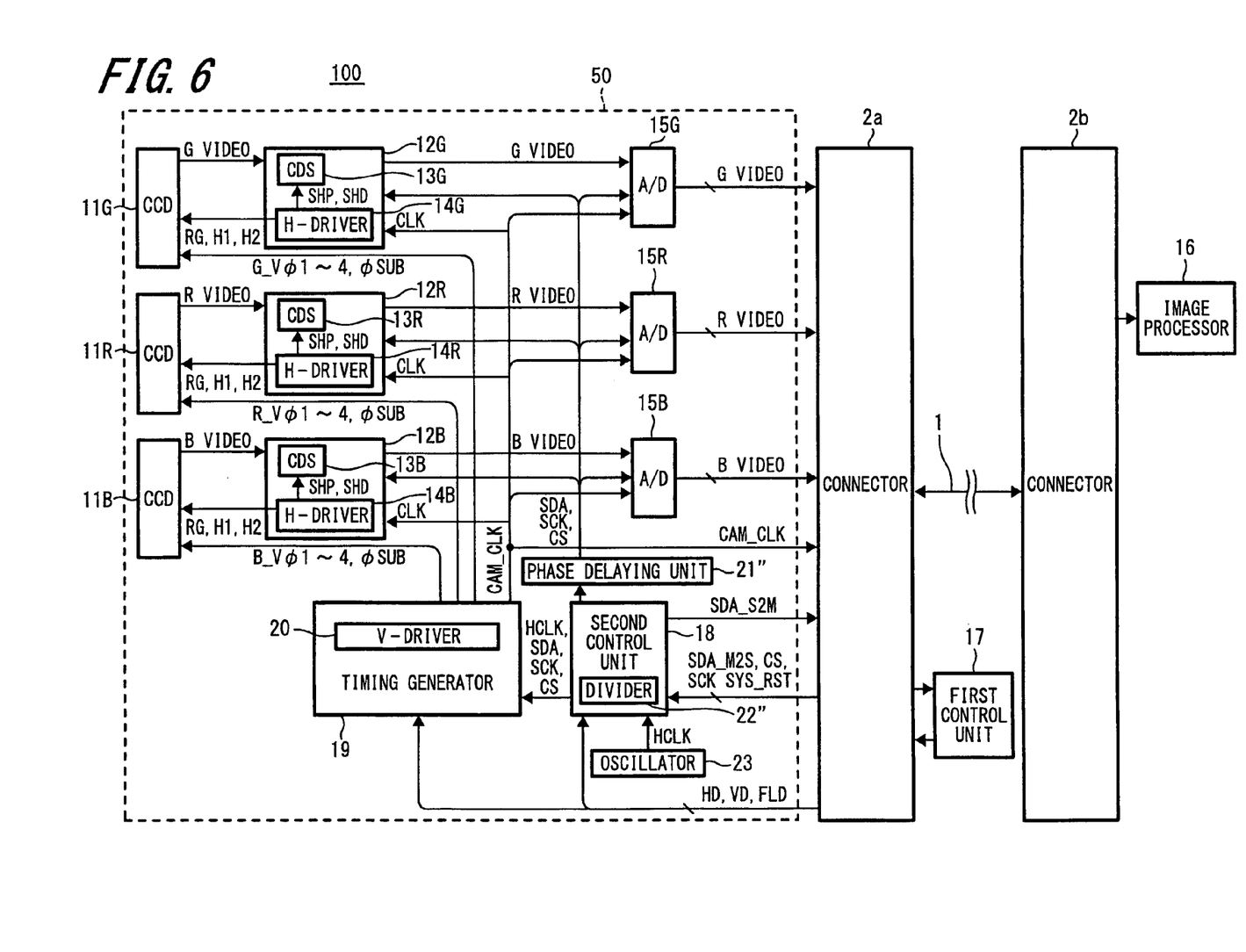
FIG. 6 is a block diagram illustrating an internal configuration example of an imaging apparatus according to still another embodiment of the present invention.

Alternatively, the camera block may include the oscillator 23 provided on the second control unit 18 side. The imaging apparatus 100 having such a configuration is illustrated in FIG. 6. According to the imaging apparatus 100 having the configuration shown in FIG. 6, the reference clock supplied from the oscillator 23 is supplied to the timing generator 19 via the second control unit 18. In the timing generator 19, a divider, not shown, divides the input reference clock, which is then supplied to the CCDs 11G, 11R, 11B, the output units 12G, 12R, 12B, and the AD converters 15G, 15R, 15B as the image synchronization clock.

The second control unit 18 includes a divider 22", for generating a clock to drive the second control unit 18 per se, and the second control unit 18 drives itself based on the clock divided by the divider 22". Setting signals received from the second control unit 18 are supplied to the components of the camera block 50 via a phase delaying unit 21" having delayed the phase of the setting signals. Accordingly, although the camera block 50 includes the oscillator 23, if the clock for driving the second control unit 18 and the image synchronization clocks supplied to other components of the camera block 50 are generated based on the same reference clock, generation of the converter noises can be suppressed.

Notice that the aforementioned delaying unit can be formed with elongating patterns of the circuit board, or formed by utilizing a cable. According to the aforementioned embodiment, the aforementioned delaying unit is utilized for an imaging apparatus; however, the delaying unit may also be employed for an image signal generating apparatus having no image sensor.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
   an imaging element photo-electrically converting light from a subject to generate an electric signal;
   an output unit generating an image signal based on the electric signal output from the imaging element;
   a timing generator generating a dock for image signal processing to drive the imaging element and the output unit based on a reference clock externally input to the imaging apparatus;
   a control unit controlling the imaging element, the output unit, and the timing generator; and
   a phase delaying unit delaying a phase of the clock for the image signal processing output from the timing generator and supplying a resulting dock with the delayed phase to the control unit to drive the control unit.

2. An imaging apparatus according to claim 1, wherein a change point of the clock delayed by the phase delaying unit and supplied to the control unit appears in a reset period of the output signal transmitted from the imaging element.

3. An imaging apparatus according to claim 2, further comprising
   a divider dividing the clock for the image signal processing in a preceding or subsequent stage to the phase delaying unit.

4. An imaging apparatus according to claim 2, wherein
   an amount of the phase of the clock delayed by the phase delaying unit is variable.

5. An imaging apparatus comprising:
   an imaging element photo-electrically converting light from a subject to generate an electric signal;
   an output unit generating an image signal based on the electric signal output from the imaging element;
   a timing generator generating a clock for image signal processing to drive the imaging element and the output unit based on a reference clock externally input to the imaging apparatus;
   a control unit controlling the imaging element and the output unit; and
   a phase delaying unit delaying a phase of the clock for the image signal processing output from the timing generator and supplying a resulting clock with the delayed phase to the imaging element and the output unit.

6. An imaging apparatus comprising:
   an imaging element photo-electrically convening light from a subject to generate an electric signal;
   an output unit generating an image signal based on the electric signal output from the imaging element;
   a clock generator generating a reference clock for driving components of the imaging apparatus;
   a timing generator generating a clock for image signal processing to drive the imaging element and the output unit based on the reference clock generated by the clock generator;
   a control unit controlling the imaging element, the output unit, and the timing generator; and
   a phase delaying unit delaying a phase of the clock for the image signal processing output from the timing generator and supplying a resulting clock with the delayed phase to the control unit to drive the control unit.

7. An image signal generating apparatus comprising:
   an output unit generating an image signal based on the electric signal externally input;
   a timing generator generating a clock for image signal processing to drive the output unit based on a reference clock externally input to the image signal generating apparatus;
   a control unit controlling the output unit and the timing generator; and
   a phase delaying unit delaying a phase of the clock for the image signal processing output from the timing generator and supplying a resulting clock with the delayed phase to the control unit to drive the control unit.

8. An image signal generating apparatus according to claim 7, further comprising
   a divider dividing the clock for the image signal processing in a preceding or subsequent stage to the phase delaying unit.

9. An image signal generating apparatus according to claim 7, wherein
   an amount of the phase of the clock delayed by the phase delaying unit is variable.

10. An image signal generating apparatus comprising;
    an output unit generating an image signal based on an electric signal externally input;
    a timing generator generating a clock for image signal processing to drive the output unit based on a reference clock externally input to the image signal generating apparatus;
    a control unit controlling the output unit; and
    a phase delaying unit delaying a phase of the clock for the image signal processing output from the timing generator and supplying a resulting clock with the delayed phase to an imaging element and the output unit.

11. An image signal generating apparatus comprising:
    an output unit generating an image signal based on an electric signal externally input;
    a clock generator generating a reference clock for driving components of an imaging apparatus;
    a timing generator generating a clock for image signal processing to drive the output unit based on the reference clock generated by the clock generator;
    a control unit controlling the output unit and the timing generator; and
    a phase delaying unit delaying a phase of the clock for the image signal processing output from the timing generator and supplying a resulting clock with the delayed phase to the control unit to drive the control unit.

12. An image signal generating apparatus comprising:
    an output unit generating an image signal based on an electric signal externally input;
    a clock generator generating a reference clock for driving components of an imaging apparatus;
    a control unit controlling the output unit;

a timing generator generating a clock for image signal processing to drive the output unit based on the reference clock input from the control unit; and a phase delaying unit delaying a phase of the clock for the image signal processing output from the timing generator and supplying a resulting clock with the delayed phase to an imaging element and the output unit.

* * * * *